United States Patent [19]

Benjamin et al.

[11] Patent Number: 4,768,027
[45] Date of Patent: Aug. 30, 1988

[54] DEVICE FOR INDICATING UNAUTHORIZED USE OF A VEHICLE

[76] Inventors: William Benjamin, 88 Underhill Road, Dulwich, London SE2; Ricky Kadoo, 55 Beadnell Road, Forest Hill, London SE23 1AA; Martin Gosling, Hurd Cottage, Cricket Hill, Yateley, Surrey GU17, all of Great Britain

[21] Appl. No.: 48,092

[22] PCT Filed: Sep. 8, 1986

[86] PCT No.: PCT/GB86/00530
§ 371 Date: May 22, 1987
§ 102(e) Date: May 22, 1987

[87] PCT Pub. No.: WO87/01344
PCT Pub. Date: Mar. 12, 1987

[30] Foreign Application Priority Data

Sep. 6, 1985 [GB] United Kingdom ............... 8522180

[51] Int. Cl.4 .................. B60R 25/10; G09F 11/10
[52] U.S. Cl. ......................... 340/691; 340/63; 340/87; 340/99
[58] Field of Search .............. 340/63, 64, 99, 691, 340/87

[56] References Cited

U.S. PATENT DOCUMENTS

| | | | |
|---|---|---|---|
| 2,635,227 | 4/1953 | Liotta | 340/87 |
| 2,803,810 | 8/1957 | Evans et al. | 340/63 |
| 3,863,212 | 1/1975 | Nyc | 340/64 |
| 3,959,613 | 5/1976 | Gerber | 340/64 |
| 4,296,402 | 10/1981 | Szczepanski | 340/64 |
| 4,631,516 | 12/1986 | Clinker | 340/87 |

FOREIGN PATENT DOCUMENTS

| | | |
|---|---|---|
| 28418 | 9/1969 | Australia. |
| 0146328 | 6/1985 | European Pat. Off.. |
| 2748364 | 11/1978 | Fed. Rep. of Germany. |
| 2929772 | 2/1981 | Fed. Rep. of Germany. |

*Primary Examiner*—Glen R. Swann, III
*Attorney, Agent, or Firm*—Browdy and Neimark

[57] ABSTRACT

A system for indicating unauthorized use of a vehicle has a display (2) which when activated by an alarm actuating device flashes alternately the word "STOLEN" and the registration number of the vehicle. The alarm actuating device comprises a housing (11) for receiving a key plug (4) and including sensing regions (12) for detecting whether resiliently mounted members (6) of the key plug (4) are in contact with their respective sensing regions (12). With an incorrect key inserted into the key plug (4) one or more of the members (6) will contact its sensing region (12) and actuate the alarm.

5 Claims, 5 Drawing Sheets

DEVICE FOR INDICATING UNAUTHORIZED USE OF A VEHICLE

FIELD OF THE INVENTION

This invention relates to a device for indicating unauthorised use of a vehicle.

BACKGROUND OF THE INVENTION

There are currently available several types of alarm which may be fitted to vehicles, in particular to cars, to give an audible warning when unauthorised use is made of the vehicle. These devices are normally actuated by opening the vehicle door or by turning the ignition key, and need to be turned on and off by the owner or authorised user of the vehicle. If he forgets to turn the alarm on when he leaves the vehicle, the alarm will not be activated, and, if he forgets to turn the alarm off when he returns to the vehicle, the alarm will sound when he attempts to drive the vehicle away. Even with the alarm on, it is often a simple matter for a thief to disconnect or otherwise render inoperative the alarm system.

SUMMARY OF THE INVENTION

According to one aspect of the present invention, there is provided an alarm actuating device responsive to an incorrect key having been inserted into a vehicle lock to actuate an alarm. Preferably the device includes a housing for receiving a key plug of the type having a plurality of resiliently mounted members movable to accommodate a key inserted into the plug, the housing including a sensing arrangement comprising a plurality of sensing regions for sensing respectively whether the resiliently mounted members are in contact with the sensing regions, there being means for actuating the alarm if one or more of said members is in contact with its respective sensing region.

It will be appreciated that a key plug with resiliently mounted members is currently fitted to most types of vehicle lock, e.g. of a door, boot or ignition. Such a key plug generally defines a cylindrical envelope for rotation in a key barrel, the resiliently mounted members being arranged so that, with a correct key inserted in the plug, none of said members extends beyond that envelope. In one form, when the correct key is inserted, end surfaces of all the members lie flush with the plug surface so that the plug can be turned within the key barrel. With an incorrect key inserted, one or more of the members will project from the plug surface, and this condition can be sensed by the sensing arrangement, e.g. when an attempt is made to rotate the plug.

According to another aspect of the present invention there is provided a display arrangement comprising: a display which is mounted or mountable on a vehicle and which has a plurality of alphanumeric character displaying regions, each capable of displaying selectively one of at least two characters; and control means for actuating the display to display normally the registration number of the vehicle and, in response to an alarm signal, an arrangement of characters indicative of unauthorized use.

An appropriate arrangement of characters might read the word "STOLEN".

In a preferred embodiment the display is a liquid crystal display, the work "STOLEN" and the registration number flashing alternately on actuation of the display. The display can hence replace the conventional vehicle number plate.

The display may be connected to an actuating device for actuating the display in response to such unauthorised use, the device being responsive to the insertion of an incorrect key into a vehicle lock, e.g. of a door or of the ignition. Such a display provides a visual indication to third parties of unauthorised use of a vehicle, without giving the thief an audible warning that it has been actuated.

A preferred embodiment of the invention has the advantage that the device is always operative and does not need to be turned on and off by a user of the vehicle. However, the alarm will only be actuated when an incorrect key has been inserted.

BRIEF DESCRIPTION OF THE DRAWINGS

For a better understanding of the present invention, and to show how the same may be carried into effect, reference will now be made, by way of example, to the accompanying drawings, in which.

DESCRIPTION OF THE PREFERRED EMBODIMENT

Figure 1:
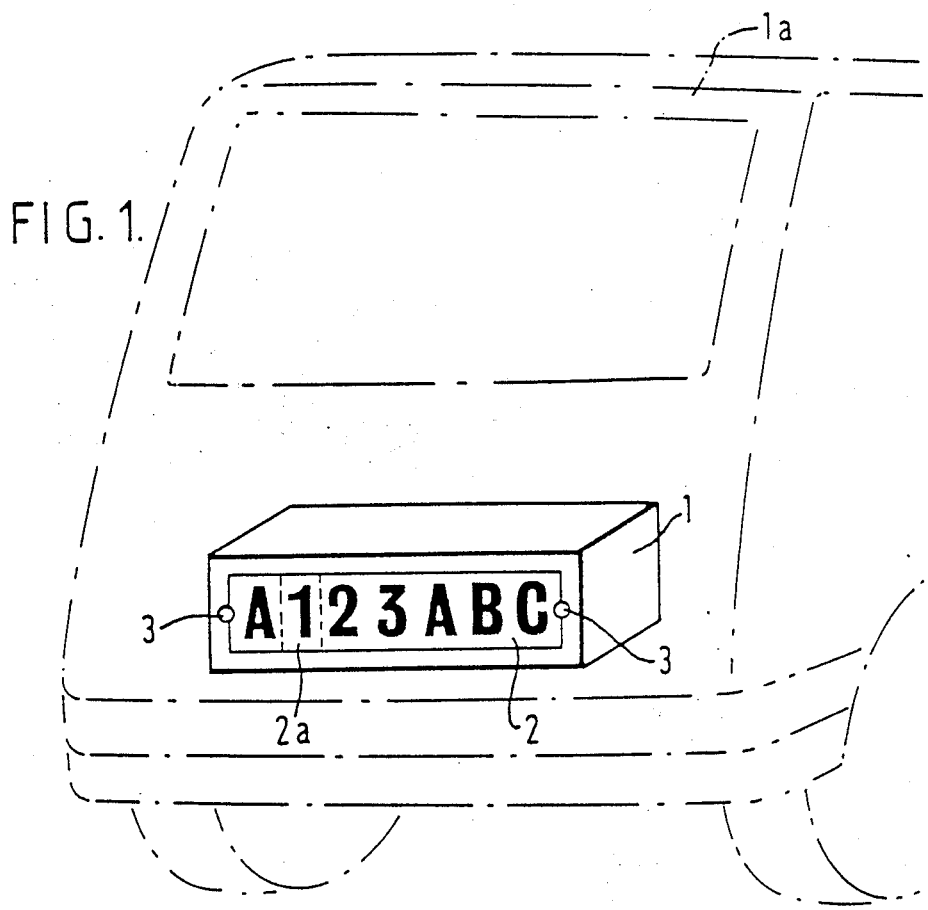
FIG. 1 shows a number plate comprising an electronic display.
Figure 2:
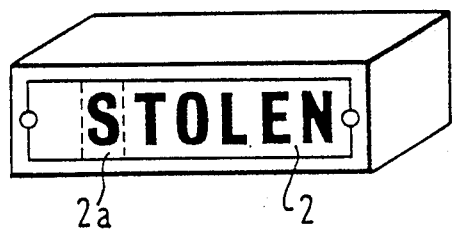
FIG. 2 shows the number plate of FIG. 1 with the word "STOLEN" illuminated on the display.

FIG. 1 shows a number plate having a plastics casing 1 provided with an electronically controllable display 2, e.g. a multi-segment display such as a liquid crystal display, for displaying the registered number of a vehicle 1a, e.g. a car, to which the number plate is to be attached. The display could also be a light emitting diode, fluorescent, electrofluorescent or optical fibre display. Such displays are readily available so that they can be easily replaced if they are damaged. The plastics casing 1 is provided with attachment means to enable it to be attached to the vehicle 1a in such a manner that it cannot be easily removed. For example, the casing may be bolted onto the vehicle at the rear from the inside of the boot, so that the bolts cannot be undone from the outside, or onto the front of the car using safety bolts. The casing 1 has holes 3 for this purpose. Alternatively, the number plate may be built into the vehicle, e.g. into its bumper or bodywork, at the manufacturing stage.

The display 2 is operated by circuitry housed by the casing 1, the circuitry being normally powered by the vehicle battery, as described in more detail hereinafter.

The display 2 has a plurality (seven as illustrated) of alphanumeric character displaying regions, each of which is capable of displaying at least two characters. For example the region 2a can display either a "1" or an "S". In this way, any six characters of the display 2, for example "123 ABC", of the registration number may be alternatively configured to read the word "STOLEN". When the display is actuated by unauthorised use of the vehicle, the number plate will flash alternately the word "STOLEN" and the registration number so as to indicate to a passer-by or police officer that the car has been stolen, and the registration number thereof. Preferably, the word "STOLEN" will appear in a different colour from that of the registration number. Any other suitable character arrangement could be utilised, for example to enable the word "STOLEN" to appear in a different language. In addition to the registration number, a vehicle identity number could be permanently displayed on the display 2.

The display is actuated when the vehicle is driven away by someone without authorisation. This is achieved by sensing the insertion of an incorrect key in a vehicle lock, e.g. of a car door or the ignition.

Figure 3:
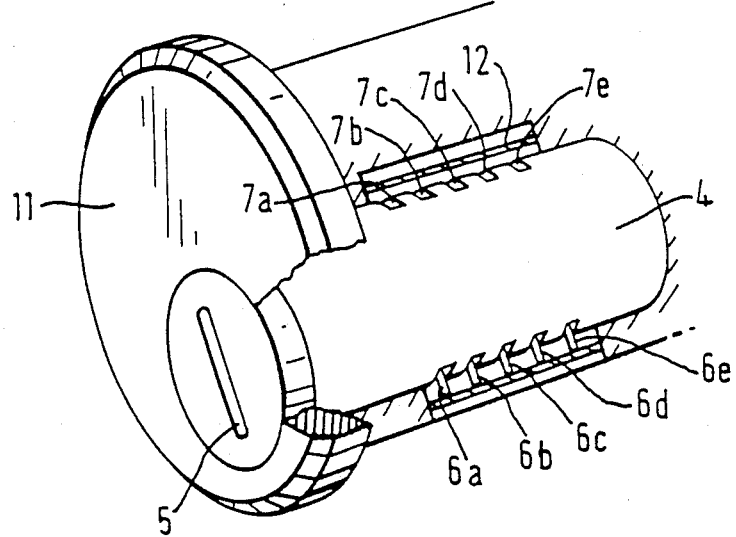
FIG. 3 is a perspective view of a key barrel partially cut-away to show the key plug.
Figure 4:
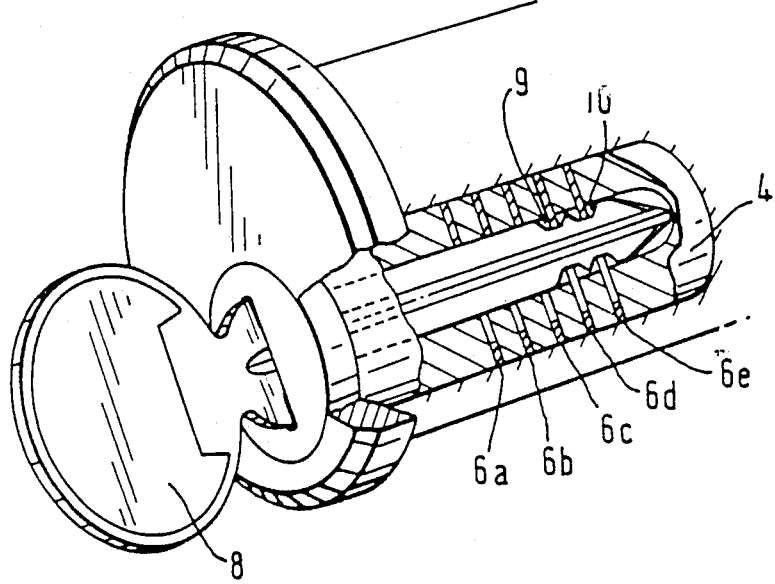
FIG. 4 shows a partially cut-away view of a key barrel showing the key plug in cross-section with a correct key inserted.

FIG. 3 illustrates a key plug 4 and barrel 11 arrangement such as may be found in a vehicle door or ignition. A plug 4 has a keyhole 5 and is provided with a plurality of resiliently mounted, apertured, plates 6a to 6e in a conventional manner. The plates can move in channels 7a, 7e respectively, so that with a key 8 inserted in the lock (FIG. 4) the plates 6a to 6e move to accommodate notches, for example 9, 10 in the key 8. As is known, with the correct key inserted in the plug 4 the edges of the plates 6a to 6e are all flush with the cylindrical surface of plug 4. This enables the plug to be turned within the barrel 11 thereby to open the door or actuate the ignition accordingly.

With an incorrect key, or other device, inserted in the plug 4, the edges of the plates 6a to 6e will not all align, so that at least one plate edge will not be flush with the surface of the plug 4. However, even in this case, it is sometimes still possible to turn the plug 4 within the barrel 11 to open the door or actuate the ignition. In these cases, the vehicle can be driven away without the permission of the owner.

According to one embodiment of the present invention, a cylindrical sensor element 12 is disposed coaxially about the plug 4 between the plug 4 and the barrel 11. The sensor element 12 has a plurality of sensing regions for sensing respectively whether the plates 6a to 6e are in contact therewith. Each sensing region has a microswitch 100 to 104 (see FIG. 6). Normally, with no key inserted, all the plates will be in contact with their respective sensing regions. With the correct key inserted, none of the plates will be in contact therewith. However, with an incorrect key or other device inserted into the plug 4, one or more of the plates will remain in contact with their respective sensing regions, while the others are disengaged thus causing an improper microswitch operation. This condition is sensed as described later and is used to actuate the circuitry controlling the display 2. As a consequence, the word "STOLEN" will flash alternately with the registration number to indicate that the vehicle is being driven without authorisation.

The insertion of an incorrect key or other device may also be arranged to actuate a buzzer or light provided on the dashboard of the vehicle. This is to indicate to an authorised user of the car that the flashing number plate has been actuated, so that he can take appropriate action.

The system will now be described in more detail with reference to FIGS. 5 to 7.

Figures 5, 6A, 6B:
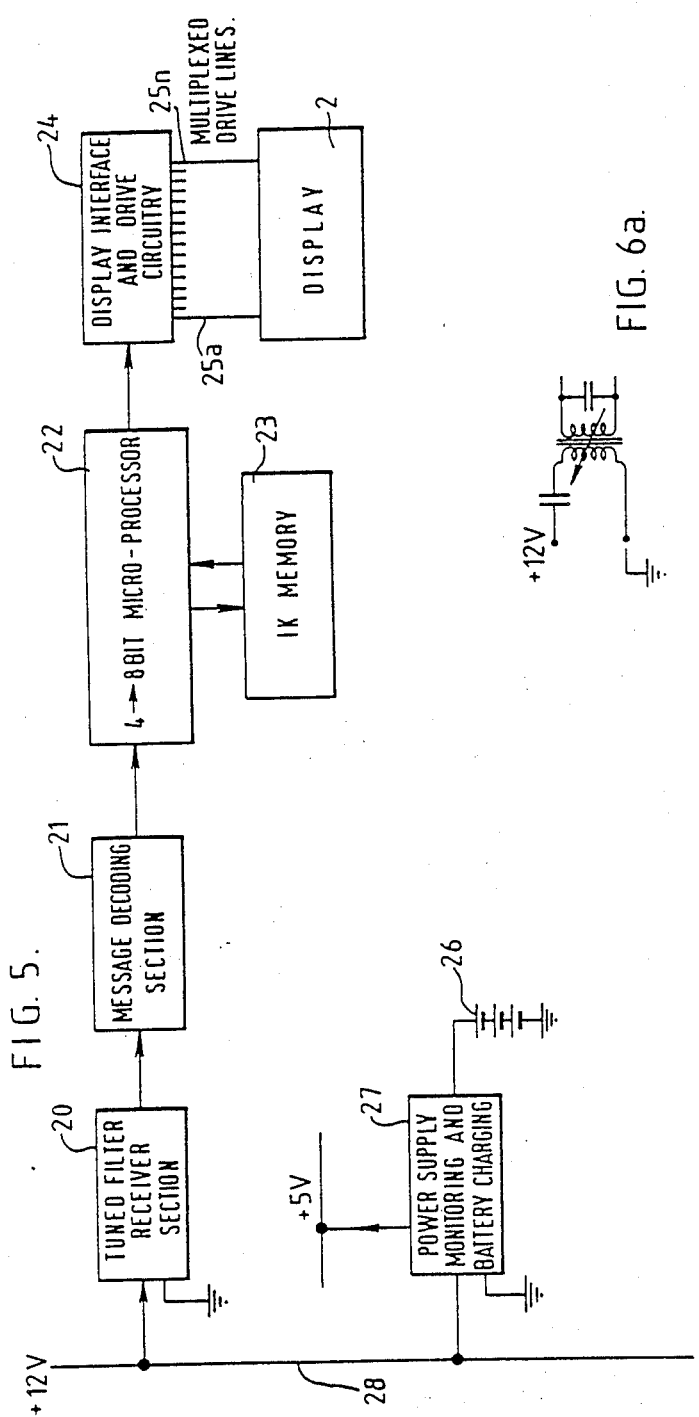
FIG. 5 is a block diagram of circuitry for operating the display.
FIG. 6a is a diagram of a variable transformer used in a power interface in the circuitry of FIG. 6.
FIG. 6b is a diagram of a message format for data controlling the system.
Figure 6:
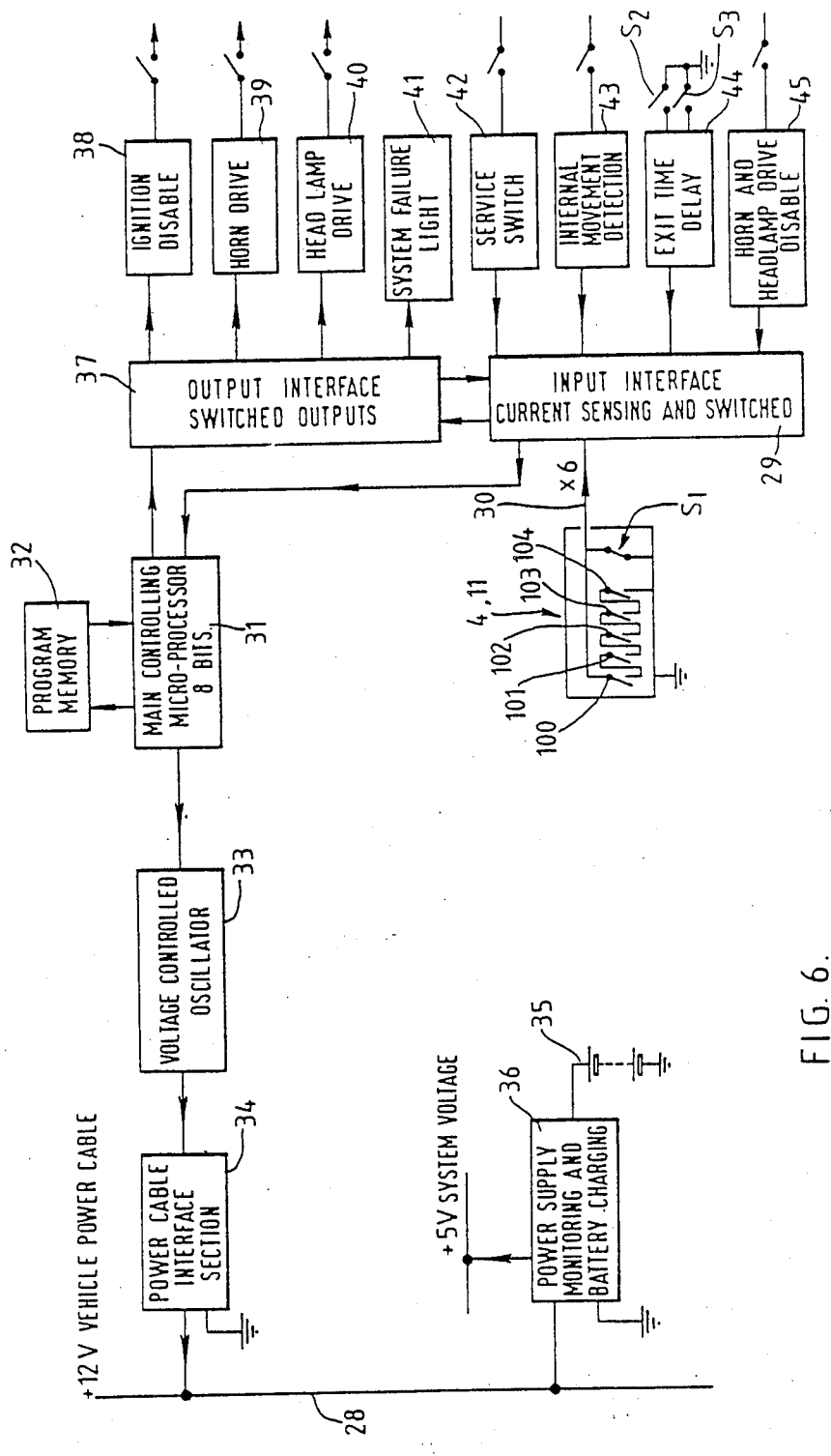
FIG. 6 is a block diagram of control circuitry for the alarm actuating system.

FIG. 5 shows a block diagram of the circuitry for operating the display 2, this circuitry being housed in the casing 1. The circuitry has a tuned filter receiver section 20 for receiving data from a control unit (FIG. 6) responsive to the sensor element 12. A message decoding section 21 in the form of a phase locked loop is connected to the filter section 20, and the message decoded in the message decoding section 21 is passed to a microprocessor 22, which may be for example a processor using CMOS technology. The microprocessor 22 is programmed to drive the display and to generate a character pattern look-up cycle. A 1K memory 23 is associated with the microprocessor 22 for storing a plurality of character patterns. The microprocessor 22 controls a display interface and drive circuit 24 to operate the display 2 via multiplexed drive lines 25a to 25n. The casing 1 also houses a back-up power supply in the form of three 5 volt nickel-cadmium batteries 26, capable of providing 48 hour drive to the display 2, and a power supply monitor and battery charger 27 for monitoring the vehicle supply to connect the nickel-cadmium batteries 26 when necessary and to recharge the batteries 26 when the vehicle power supply is connected. The power supply monitor and battery charger 27 is connected between the vehicle 12 volt power cable 28 and the vehicle earth. The vehicle power cable 28 also serves as the data transmission cable for transmitting messages from the control unit to the tuned filter receiver section 20. By utilising the vehicle power supply in this way, the control unit can communicate with front and rear number plates also connected to the vehicle power supply. Installation of the number plates is simple, since they only have to be connected between vehicle earth and the vehicle power supply, minimising the number of wire connections needed for installation.

The control unit will now be described in more detail with reference to FIG. 6. The control unit comprises an input interface 29 connected to sense via the sensor element 12 the current flow along an input cable 30. The sensor element 12 includes microswitches 100 to 104 corresponding respectively to the plates 6a to 6e and connected in series between vehicle earth and the input interface 29. In FIG. 6 the plug 4 and barrel 11 of the key are shown diagramatically only. In order to prevent the alarm from being actuated when a correct key is simply moved to and fro in the plug 4 before actual insertion a barrel position sense switch S1 is provided to detect the position of the barrel and to activate the switches 101–104 only when the plug has moved through one third of its rotation in the barrel. The microswitches 100 to 104 and barrel position sense switch S1 are normally closed switches. In a standby condition of the alarm the microswitches 100 to 104 are held open by the plates 6a to 6e, and the barrel position sense switch S1 is closed. A current hence flows via switch S1. With a key inserted and the barrel turned through one third of its final rotation, the barrel position sense switch S1 opens. In this condition a current will only flow if all the microswitches 100 to 104 are closed, that is they have all been released by movement of the plates 6a to 6e with insertion of a correct key. With an incorrect key no current flows and this condition can be sensed by the interface 29. When the latter condition is sensed, an "alarm" signal to this effect is passed to a control microprocessor 31. If the wire 30 is cut, the current flow will cease and this case will also be sensed at the input interface 29. It would be possible to have an arrangement such that if an attempt is made to circumvent the barrel of the lock with a shorting link then the current flow through cable 30 will alter since a resistive element and the microswitches in the lock will have been bypassed. This condition can be sensed by the interface, which includes an accurate current sensing element.

The microprocessor 31 has a memory 32 and is programmed to pass a message to the display circuitry via the vehicle power cable 28. The signal from the microprocessor 31 is passed via a voltage controlled oscillator 33 to a power cable interface section 34 having a variable transformer arrangement as shown in more detail in FIG. 6b. Data is transferred from the microprocessor 31 to the display circuitry by frequency modulation of the vehicle power supply using any suitable modulation, for example frequency shift keying modulation with a signal frequency in the range 500 kHz to 1 MHz and a band width separation of between 5 and 10 kHz. One form of message format is shown in FIG. 6b and comprises a preamble of four bits, a vehicle identity number of 20 bits, the vehicle registration number of 20 bits an optional command statement of 4 bits and an error detection of 12 bits.

The memory 32 is an electrically erasable programmable read only memory (EEPROM) which contains the identity of the vehicle. The control unit is preferably contained in a single housing which can be attached to the vehicle in any convenient location, it only being necessary to make one or two connections between the vehicle power supply and vehicle earth, and to the lock(s), so that installation is simple. The housing can have a spring loaded device responsive to any attempt to remove it to clear the memory 32, so that a system cannot be transferred from one vehicle to another. Thus, if the control unit is removed from the vehicle, the identity is erased so that the unit cannot be used on any other vehicle. The memory 32 can be part of a hybrid microcircuit containing data and information known only to the car manufacturer. When a vehicle is initially registered (at, as far as the United Kingdom is concerned, the Driver Vehicle Licensing Centre) the hybrid microcircuit can be sent from the Registration Centre to be fitted into the control unit. This means that it is not possible to mask the true registration of the car simply by fitting new number plates, since the only number which will be displayed is stored in the memory and cannot be altered.

The control unit shown in FIG. 6 has a back up power supply consisting of nickel-cadmium batteries 35 and a power supply monitor and battery charger 36 connected between the vehicle power cable 28 and vehicle earth in substantially the same way as described with reference to the back up power supply in the casing 1 (FIG. 5). The circuitry of FIG. 6 also has, connected to receive a signal from the microprocessor 31, an output interface 37 for driving selectable auxiliary output circuits such as an ignition disable circuit 38, a horn actuating circuit 39, a headlamp actuating circuit 40 and a system failure warning light 41. In order to determine which of the auxiliary circuits can be utilised, auxiliary input circuits are provided supplying signals to input interface 29, the auxiliary input circuits including service switch 42, internal movement detection circuit 43, a variable exit time delay 44 and a horn and headlamp drive disable circuit 45. In the illustrated embodiment the exit time delay can be controlled to set a time of 15 or 30 seconds via switches S2 and S3 respectively which will activate the output auxiliary circuits so many seconds after the ignition has been switched off. The internal movement detection circuit can be one of the currently available electronic locking or infrared systems for detecting unauthorised removal of articles from a vehicle. In the event of an alarm, the auxiliary circuits can be reset using a correct key or the service switch 42. The circuitry can be arranged so that the auxiliary circuits are automatically disabled for a predetermined time period when the door is opened with a correct key. Similarly, once the ignition has been activated, the auxiliary circuits can be arranged to be switched off.

Figures 7A, 7B:
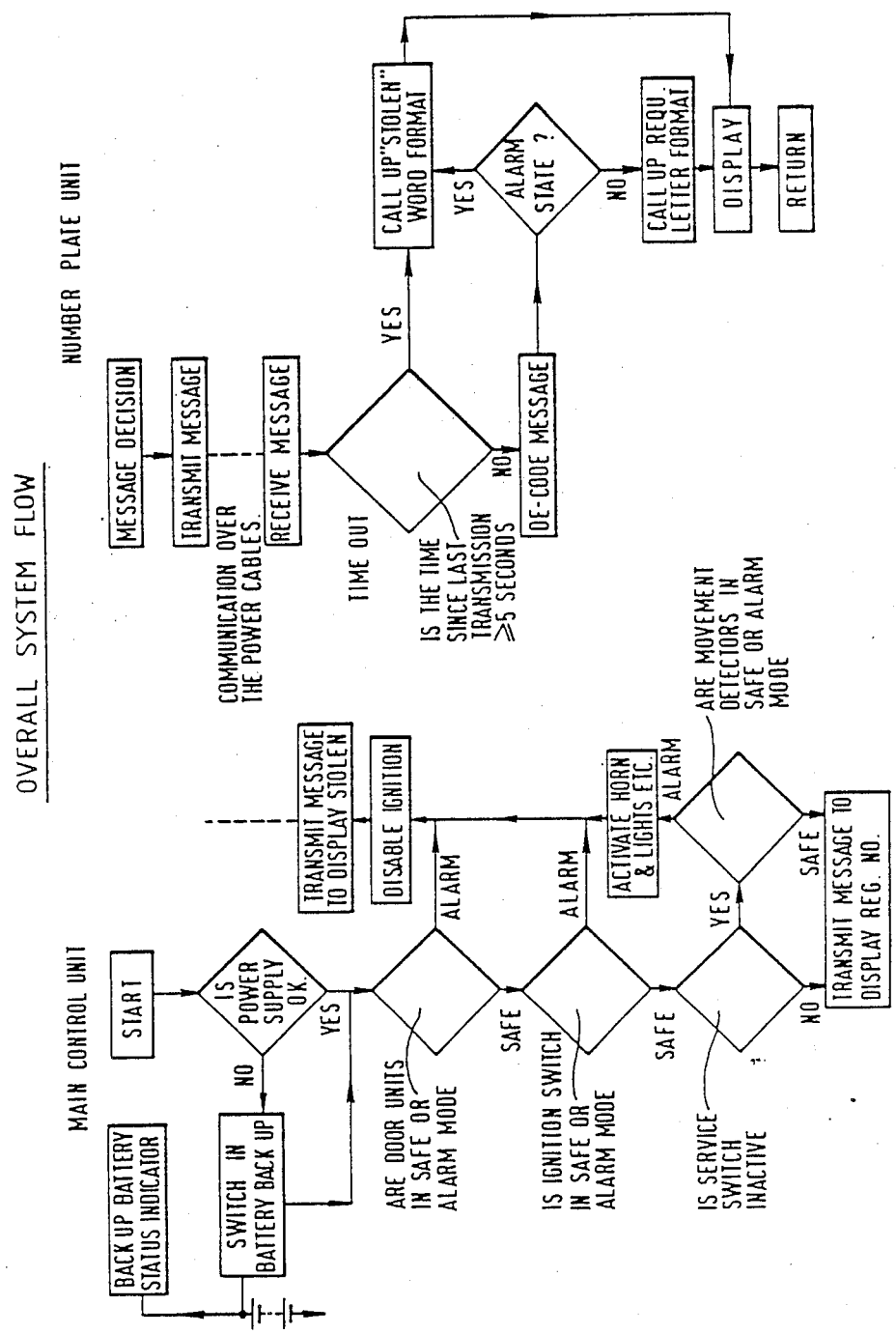
FIGS. 7a and 7b are flow charts illustrating operation of the alarm actuation system.

Use of the system will now be described with reference to FIGS. 7a and 7b. FIG. 7a illustrates the flow chart of operation of the control circuitry. Firstly the power supply is checked and, if it is not satisfactory, the back up battery is switched in and a back up battery status indicated is activated. When a suitable power supply has been set up, the door locks are scanned to see whether they have been put into an alarm mode by use of an incorrect key. If they have, a signal is passed via vehicle power cable 28 to the output interface 37 to disable the ignition and to the display circuitry. If the door units are "safe", the ignition key plug is scanned to ascertain whether that has been put into an "alarm" mode by use of an incorrect key. If the ignition switch is in an "alarm" mode, the ignition is disabled and a message transmitted to the display circuitry as described earlier. If both the door and ignition switches are safe, the service switch is scanned to see whether it is operative or not. If the service switch is not active, the conventional movement detectors which may be provided are scanned and, if they have been put into an alarm mode, the horn and lights etc are activated and a signal is passed to disable the ignition and to transmit a message to the display circuitry to flash the word "STOLEN". If either the service switch is active or the movement detectors are in a "safe" mode a message is transmitted to the display circuitry to display the registration number of the vehicle.

Referring now to FIG. 7b, a message is transmitted via the vehicle power supply cable 28 and is decoded to see whether it indicates an "alarm" state or a "safe" state. If an "alarm" state is indicated the word "STOLEN" is displayed on the display 2 and if a "safe" state is indicated the registration number of the vehicle is displayed. A time out is provided to assess whether the message has altered in each five second period.

The arrangement described above thus provides a way of indicating to passers by or to police that a car has been stolen. The only way to render the flashing plate inoperative is to remove it, which would attract the attention of passers by. In many cases, the thief will not even be aware that the plate is flashing since there is no audible warning. Even with a buzzer on the dashboard, he may well assume that this is to indicate an engine condition or the like.

The use of the auxiliary circuits can be such that, on insertion of an incorrect key into the door or book locks, an audible warning can be given by means of a buzzer or the like. If a thief persists and inserts an incorrect key into the ignition, the system operates to actuate the display and also to disable the ignition system of the car.

We claim:

1. A display arrangement comprising a display which is mounted or mountable on a vehicle and which has a plurality of alphanumeric character displaying regions, each capable of displaying selectively one of at least two characters; and control means for activating the display to display normally the registration number of the vehicle and, in response to an alarm signal, to display alternately said registration number and an arrangement of characters indicative of unauthorised use.

2. In combination, a display arrangement according to claim 1 mounted on a vehicle and a device for actuating said alarm signal, said alarm device being responsive to insertion of an incorrect key into a lock of said vehicle.

3. A combination according to claim 2, including a housing for receiving a key plug of the type having a plurality of resiliently mounted members movable to accommodate a key inserted into the plug, the housing including a sensor arrangement comprising a plurality of sensing regions for sensing respectively whether the resiliently mounted members are in contact with the sensing regions, there being means for actuating the alarm if one or more of said members is in contact with its respective sensing region.

4. A combination according to claim 3, including a key plug defining a cylindrical envelope and having a plurality of resiliently mounted members movable to accommodate a key inserted into the plug, the sensing arrangement being operable to sense when at least one of said members extends at least a predetermined distance beyond the cylindrical envelope.

5. A combination according to claim 3, including a key plug defining a cylindrical surface and having a plurality of resiliently mounted members which are such that, when the correct key is inserted in the plug, end surfaces of all the members lie flush with said cylindrical surface so that the plug can be turned within a key barrel and, with an incorrect key inserted, one or more of the members will remain projecting from said cylindrical surface.

* * * * *